Feb. 17, 1942.  V. KOTLIAREVSKY  2,273,757
SWITCH UNIT FOR AUTOMOBILE HORNS
Filed July 31, 1941  3 Sheets—Sheet 1
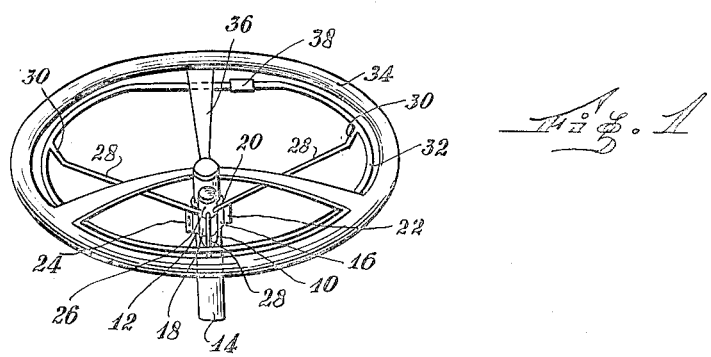
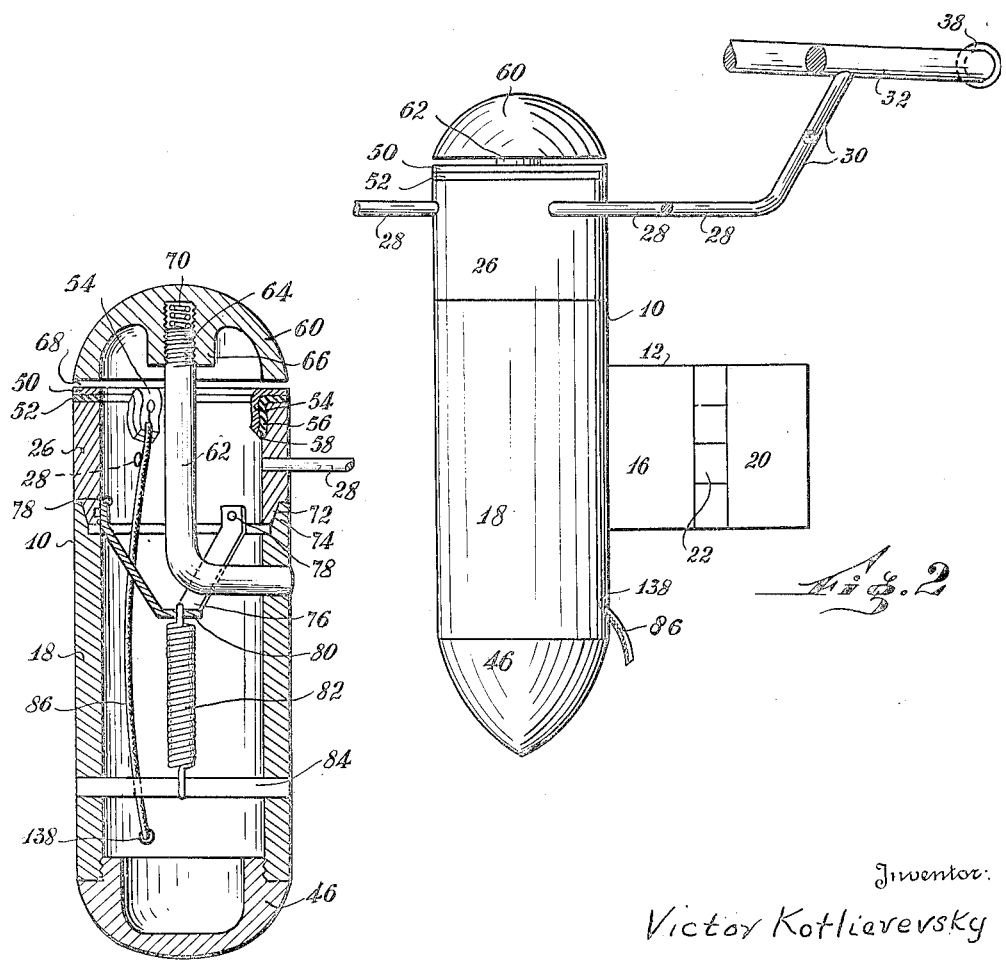
Inventor:
Victor Kotliarevsky
By Stevens and Davis
Attorneys

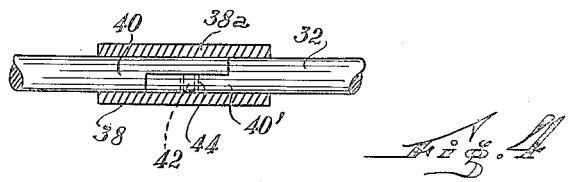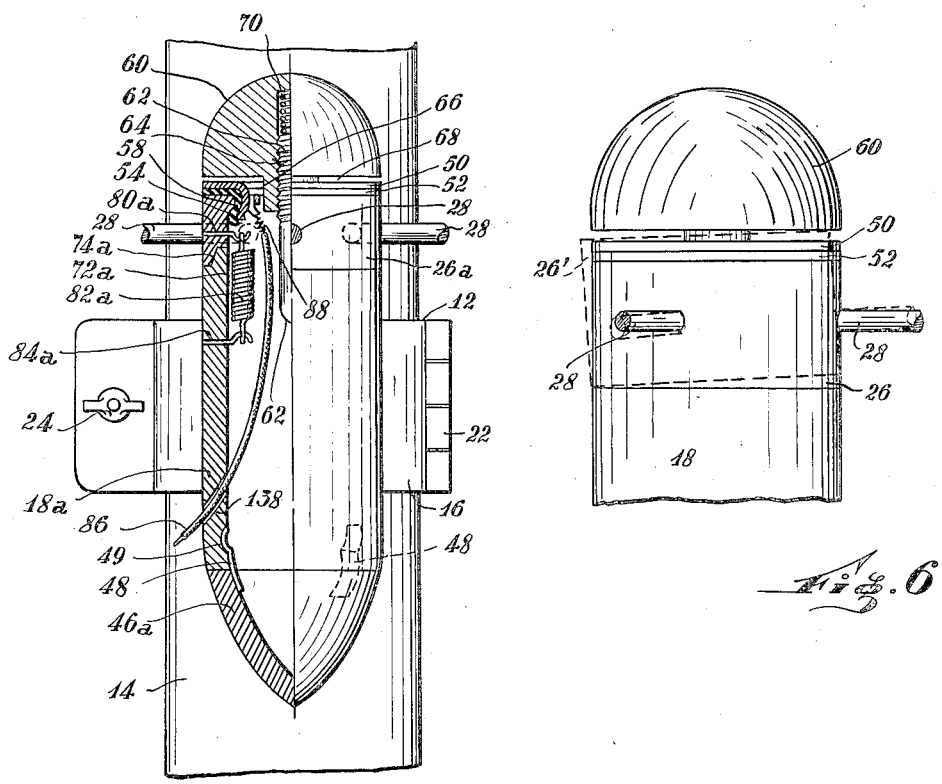

Feb. 17, 1942.    V. KOTLIAREVSKY    2,273,757
SWITCH UNIT FOR AUTOMOBILE HORNS
Filed July 31, 1941    3 Sheets-Sheet 3

Inventor
Victor Kotliarevsky

By Stevens and Davis
Attorneys

Patented Feb. 17, 1942

2,273,757

UNITED STATES PATENT OFFICE 2,273,757

SWITCH UNIT FOR AUTOMOBILE HORNS

Victor Kotliarevsky, Charata, Chaco, Argentina

Application July 31, 1941, Serial No. 404,942
In Argentina October 31, 1940

4 Claims. (Cl. 200—59)

The present invention relates to vehicles such as automobiles, which are fitted with electrically operated horns or the like warning devices, and more particularly to switch means for operating such horns at will.

Owing to the large number of motor vehicles to be found on the public roads nowadays, the devices such as horns, adapted to give warning of the approach of a vehicle at crossings and the like, are of considerable importance from the point of view of public safety, and hence the ready accessibility of the operating devices to the driver is a matter to which considerable attention has been given in modern motorcar design. Many makes of cars are fitted with a switch located in the top of the steering column, while others have installed a horn operating device comprising a switch adapted to be actuated by means of an annular member positioned close to the rim of the steering wheel so as to be capable of being grasped by the driver's hands without requiring lifting of the hands from the rim. While such fitments are becoming standard practice, they are absent in some makes of car and to a considerably greater extent, in older models. To bring these older models up to date as regards the horn control or actuating device, would entail removing the steering column and wheel and substituting others adapted to receive the fitments, and might, in some instances involve other structural modifications as well.

The present invention seeks to remedy this defect and overcome the difficulties just stated by providing a switch unit adapted to be attached to a steering column without interfering with the general structure thereof, said unit including a ring adapted to be positioned in close proximity to the rim of the steering wheel and connected to the unit by means of arms terminating in a rocking contact bearing member adapted to cooperate with a fixed contact member forming part of the switch.

The principal object of the present invention is therefore to provide a switch unit adapted to actuate a motor-car horn or the like, and to be readily attached to the steering column without involving structural modifications and to be operated from any point of the rim of the steering wheel.

Another object of the present invention is to provide, in a switch unit of the type described, switch means of a simple construction including a rocking contact bearing member and resilient means for normally holding said rocking member in a balanced off position and restoring said rocking member to said position after it has been rocked in any radial direction.

A further object of the present invention is to provide a switch unit of the kind described in which the rocking member is rigidly connected by arms to a substantially ring shape operating member including a separable coupling to enable said ring member to be located in close proximity to the rim of a steering wheel and entirely surrounding the steering column, without requiring dismantlement of the steering gear.

These and other objects and advantages of the present invention will become apparent in the course of the following description of certain preferred embodiments thereof, in which reference will be had to the accompanying drawings, in which:

Fig. 1 is a perspective view of a steering wheel and part of a steering column fitted with a switch unit according to the present invention.

Fig. 2 is a side view on an enlarged scale of the new switch unit with certain parts broken away.

Fig. 3 is a longitudinal section of one form of the switch device which is part of the novel switch unit.

Fig. 4 is a detail sectional view showing one form of separable coupling for the operating ring.

Fig. 5 is a part sectional view of a modified form of switch device shown attached to a section of steering column.

Fig. 6 is an enlarged view of the head portion of the switch device illustrating the operation thereof.

Figure 7:
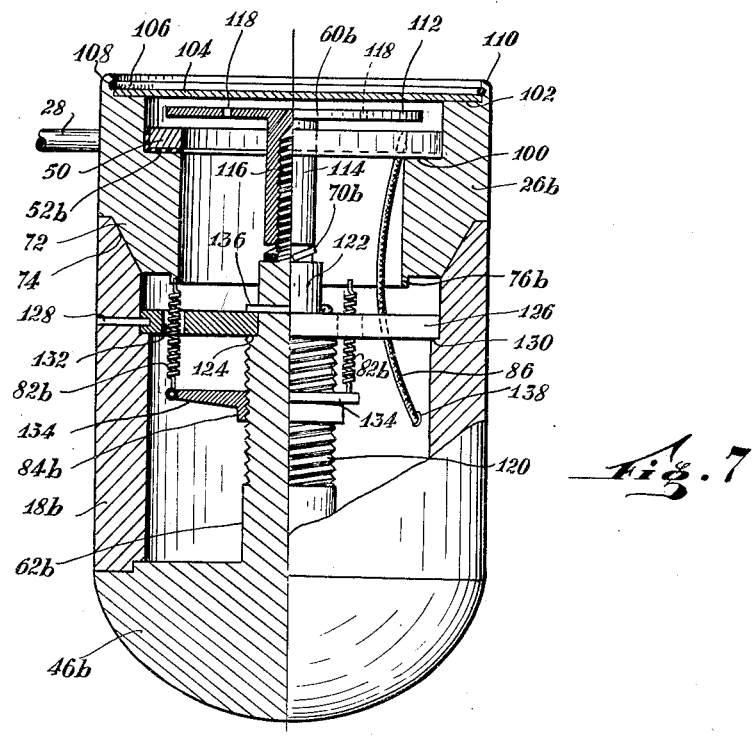
Fig. 7 is a part sectional view of a third embodiment of the switch device.

With particular reference to Figs. 1 and 2, it will be seen that the horn operating switch unit of the present invention comprises a switch device 10 having clamping means 12 adapted to permit mounting of the device to the steering column 14 of a mechanically propelled vehicle. Said clamp comprises a portion 16 fast on a body portion 18 of the switch device 10 and a movable portion 20 attached to the portion 16 by means of a hinge 22 and adapted to be locked in mounting or gripping position by means of a bolt and wing nut indicated generally at 24.

Above the body portion 18 of the switch device 10, there is mounted to rock on said body portion, a contact bearing portion 26, from which extend a plurality of arms 28 the ends 30 of which may be bent in a direction away from the body portion as shown, said ends terminating in an operating member 32 formed of a rod or bar bent to define a closed figure which in general will be similar to the contour of the rim 34 of the steering wheel 36. To permit said operating member 32 to be positioned so as to surround the steering column 14, the rod or bar has at one point separable ends adapted to be connected together by means of a separable coupling 38. In the embodiment illustrated in Fig. 4, the separable ends of the rod are shaped to be positioned in overlapping relationship as shown at 40 and 40', one of said ends having a pin or stud 42 adapted to engage a perforation 44 of the other end to prevent separation of the ends lengthwise of the rod, the said ends being held in overlapping relationship by means of a sleeve 38a adapted to be slid into and out of joint retaining position.

The switch device may take several forms, but will always comprise a body portion 18 the lower end of which may conveniently be closed by means of a plug 46. In the embodiment of Fig. 3, said plug is adapted to be screwed into said lower end, whereas in other embodiments other securing means may be provided, as will be more fully explained hereinbelow. The switch device will also always include a rocking contact bearing portion 26, which, like the body portion 18, is hollow, and at its end remote from the body portion has secured to it a contact ring 50 electrically insulated from the contact bearing portion, as by means of a member or annulus 52 of insulating material, such as fibre, interposed between the contact ring and the upper end of the rocking portion 26. The contact ring may be secured in position to the rocking portion 26 by means of depending resilient arms 54 adapted to engage shallow recesses 56 formed on the inner surface of the rocking portion 26, said arms being electrically insulated from the rocking portion by means of strips of insulating material 58 integral with and depending from said annulus 52.

On the side of the contact ring 50 remote from the rocking portion 26, and in spaced relation thereto, there is fixedly supported a stationary contact member 60 electrically connected to the body portion 18, as by means of a right angled arm 62 having one end rivetted or welded to the body portion and the other end screw threaded as indicated at 64 to receive the contact member 60, which, to this end, has formed on it an internally threaded boss 66. In order to prevent accidental slackening of the contact member 60 and alteration of the gap 68 separating it from the contact ring 50, a safety spring 70 may be provided within the boss 66.

The rocking contact bearing portion 26 is coupled to rock on one end of the body portion 10 by means of a joint comprising a conical spigot 72 adapted to fit in a conical socket 74 formed in said end of the body portion 10. It will be understood that the spigot and socket are both annular, and that by means of this joint, the contact bearing portion may be rocked to a position inclined with respect to the body portion 10, from any point of its circumference or perimeter. The contact bearing rockable portion 26 is normally held in a balanced position in which the contact ring 50 is substantially parallel to and spaced from the contact member 60, by resilient means connected between the contact bearing portion and the body portion.

In the example shown in Fig. 3, the resilient means comprises a stirrup member 76 having preferably three arms fixedly secured to the interior of the contact bearing member at their free ends 78, as by spot welding, said arms extending from a central base 80 to which one end of a coiled spring 82 is secured, the other end of said spring being anchored to a bar 84 provided in the lower part of the body portion 10.

In the modification shown in Fig. 5, the spigot 72a of the rocking joint is formed on the body portion 18a and the socket 74a on the contact bearing portion 26a, and the resilient connection between these two portions consists of a plurality, preferably three, of springs 82a stretched between upper and lower hook members 80a and 84a provided on the inside surfaces of the contact bearing portion and the body portion respectively. In this figure, there is also shown an alternative method of securing the plug 46a to the body portion, said plug 46a having projecting therefrom a plurality of resilient tongues 48 adapted to engage recesses 49 on the inside of the lower part of the body portion 18a.

It will be observed that in the two embodiments so far described, the contact member 60 and the gap 68 are permanently exposed, and consequently dust and dirt may accumulate in said gap thus interfering with the operation of the switch device. Moreover, moisture may easily penetrate into the interior of the contact bearing portion and the body portion, and cause rusting of the springs which hold the contact bearing portion normally balanced in off position, and such rusting may lead to failure of the springs or some of them, thus causing the contact bearing portion to adopt an inclined position closing the horn circuit and making the horn sound continuously until the circuit is positively broken elsewhere or the damage repaired. These objections may readily be overcome by slightly modifying the construction as indicated by way of example in Fig. 7.

In this embodiment, the rockable contact bearing portion 26b is provided with an inner recess 100 in its end remote from the body portion 18b, and an outer relatively shallow recess 102, both said recesses extending right round the hollow contact bearing portion 26b. In the inner recess the contact ring 50 is located, being insulated from the contact bearing portion by means of an L section annulus 52b of insulating material. In the outer recess 102 is located a cover disc 104 of any convenient material, such as metal, vulcanite, glass, wood or synthetic products, which is firmly held in position by means of a spring ring 106 which partially engages with a groove 108 formed in the upstanding lip 110 of the contact bearing portion. If desired, packing (not shown) may be interposed between the disc 104 and the bottom of the recess 102 to further ensure weather-tight conditions.

Between the contact ring 50 and the cover disc 102 is located the fixed contact member 60b, which in this example comprises a disc shaped head 112 and a depending integral stem 114 bored and screw threaded internally to allow it to be screwed on to a threaded end portion 116 of a contact supporting member 62b. To facilitate assembly of these parts, holes 118 may be provided in the head 112, so that it may be securely screwed onto the end portion 116 by means of a tool, since the space between the edge of said head and the circumferential face of the inner recess 100 will in general be far too narrow to permit of the insertion of the fingers to grasp the head 112 by its edge.

The contact supporting member 62b which replaces in this embodiment the right angled arm 62 of Figs. 3 and 5, is a stem projecting from and integral with the plug 46b, said stem comprising an intermediate threaded portion 120 separated from the end portion 116 by a reduced plain portion 122, whereby a shoulder 124 is formed with which an abutment plate 126 is adapted to contact. The abutment plate is fixedly secured within the hollow body portion 18b, as by rivets 128, and conveniently rests on a shoulder 130 formed on the inside face of said body portion. The abutment plate has a plurality of holes 132, through which a plurality of springs 82b are adapted to pass, said springs being anchored at one end to a lip 76b depending from the contact bearing portion 26b, and at the other end to the free ends of arms 134 projecting from an anchorage member 84b screwed onto the intermediate portion 120 of the stem 62b. The abutment plate 120 may conveniently be locked to the stem as by a cotter 136, and the safety spring 70 of the embodiment of Fig. 3 may be replaced by a spring washer 70b in Fig. 7.

It will be seen that the construction last described provides for enclosure of all the operative parts of the switch means, while still permitting of the rocking of the contact bearing member and the maintenance thereof in balanced off position by resilient means.

The electric circuit of the switch device includes a frame connection established through the contact of the body portion with the steering column, or if desired by means of a separate conductor connecting the body portion to the frame of the vehicle. Since the fixed contact member 60 is in electrical contact with the body portion through the supporting arm or stem, it will also be permanently at frame potential. The contact ring 50 is connected to the corresponding terminal of the horn or other signalling device, by means of an insulated conductor 86 soldered or otherwise electrically connected to the ring or to the depending arms 54 thereof and passed out of the switch device through an aperture 138 in the body portion 18. If desired a resistance shown at 88 in Fig. 5 may be connected in series with conductor 86.

From the foregoing to those skilled in the art it will be understood that the switch unit is adapted to be detachably mounted on the upper portion of the steering column 14 by means of the clamp 12, in the position shown in Fig. 1.

Figure 8:
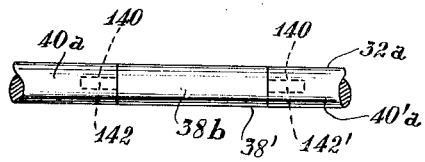
Fig. 8 is a detail view of an alternative form of separable coupling for the operating ring.

When mounting the unit the sleeve 38a of the separable coupling of the operating member 32 is slid back so as to permit a separation of the ends 40, 40' so that that portion of the operating member may be moved past the steering column 14 into the position shown in Fig. 1 in which it will be noticed that the operating member 32 lies slightly within and below but parallel to the rim 34 of the steering wheel 36. In this way the fingers of a hand resting on the said rim 34 may grasp or touch the operating member 32 from any point of the circumference of the rim to raise or depress the operating member 32 and thereby cause locking of the contact bearing member 26 from its normal balanced position shown on full lines in Fig. 6 to a rocked circuit closing position indicated at 26' in dotted lines in Fig. 6. In this position as clearly shown in Fig. 6 the contact ring 50 is brought into engagement with the contact member 60 and thus closes the operating circuit for the horn or the like. As soon as the operating member 32 is released the resilient member or members 82 bring the contact bearing portion 26 back into its balanced or off position thus breaking the aforesaid operating circuit. The separable coupling construction shown in Fig. 4 may if desired be replaced by the simplified form shown in Fig. 8 in which the separable ends 40a and 40a' of the operating member 32a are drilled as indicated at 140 to receive pins 142, 142' projecting from opposite ends of a coupling member 38b adapted to be inserted between said two ends. For this purpose the operating member 32a must have a certain amount of resiliency so that when the member 38b is removed the ends 40a, 40a' tend to approach each other. This construction avoids damaging the outer finish of the operating member 32a as would occur in time in the construction shown in Fig. 4 owing to the friction of the sleeve 38a if the unit is dismantled repeatedly as in overhauling the car. Another advantage of the construction of Fig. 8 is that it provides a continuously smooth surface for the operating member 32a.

While the present invention has been described with reference to certain specific embodiments, it is not intended to be limited thereby but it is to be understood that various modifications in construction and detail may be made without departing from the spirit and scope of the present invention as defined in the appended claims.

I claim:

1. A switch unit for actuating electrically operated horns and the like signalling devices and adapted to be detachably mounted to the steering column of mechanically propelled vehicles, said steering column bearing a steering wheel including a rim, said unit comprising a switch device including a hollow body portion having clamping means for detachably mounting the device to said steering column, and having rockably mounted on one end thereof a hollow contact bearing member on the end of which remote from said body portion there is secured a contact ring electrically insulated from said contact bearing member, a fixed contact member electrically connected with said body portion and including the contact surface, said contact member being rigidly supported with said contact surface in parallel spaced relationship with the side of said contact ring remote from said contact bearing portion, plug means in the other end of said body portion to close the same, and resilient balancing means operatively connected between said contact bearing portion and said body portion normally to maintain said contact bearing portion in balanced off position, while permitting rocking of said contact bearing portion with respect to said body portion to bring said contact ring into electrical engagement with the contact surface of said contact member, said contact bearing portion having extending therefrom outwardly a plurality of arms terminating at their ends remote from the contact bearing portion in an operating member defining a closed figure and including a pair of opposed ends normally connected together by a separable coupling, said operating member being adapted, when the switch unit is mounted on said steering column, to lie in parallel and closely spaced relationship to said rim.

2. A switch unit for actuating electrically operated horns and the like signalling devices, and adapted to be detachably mounted to the steering column of mechanically propelled vehicles, said steering colunm bearing a steering wheel including a rim, said unit comprising a switch device including a hollow body portion having clamping means for detachably mounting the device to said steering column, said body portion having at one end an annular conical socket, a hollow contact bearing member having at one end an annular conical spigot, adapted rockably to engage said socket, and having mounted thereto at its other end a contact ring electrically insulated from said contact bearing member, a right angled arm rigidly secured at one end to said body portion and an eelctrical connection therewith said arm extending transversely within said body portion and lengthwise through the interior of said contact bearing portion, and having a screw threaded end projecting beyond the contact ring bearing end of said contact bearing portion, a fixed contact member screwed onto said threaded end of said arm and having a contact surface normally positioned in parallel spaced relationship to said contact ring, resilient balancing means connected between said contact bearing portion and said body portion, said resilient means comprising a stirrup member including a base and a plurality of arms extending outwardly from said base and rigidly secured at their free ends to the interior of the contact bearing portions, an anchoring bar fixedly mounted within said body portion and spring means anchored at one end to said anchoring bar and at the other end to said base and adapted to hold said contact bearing portion in normally balanced rockable engagement with said body portion and thereby maintain said contact ring normally in substantially parallel spaced relationship with said contact surface, while permitting rocking of said contact bearing portion with respect to said body portion to bring said contact ring into electrical engagement with the contact surface of said contact member, said contact bearing portion having extending therefrom outwardly a plurality of arms terminating at their ends remote from the contact bearing portions in an operating member defining a closed figure and including a pair of opposed ends normally connected together by a separable coupling, said operating member being adapted, when the switch unit is mounted on said steering column, to lie in parallel and closely spaced relationship to said rim.

3. A switch unit for actuating electrically operated horns and the like signalling devices and adapted to be detachably mounted to the steering column of mechanically propelled vehicles, said steering column bearing a steering wheel including a rim, said unit comprising a switch device including a hollow body portion having clamping means for detaching mounting the device to said steering column, said body portion having at one end an annular conical spigot, a hollow contact bearing member having at one end an annular conical socket adapted rockably to engage said spigot, said contact bearing member having mounted on its other end a contact ring electrically insulated from said contact bearing member, an insulated conductor connecting said contact ring in the operating circuit of the signalling device, a conducting arm rigidly secured at one end to said body portion and having a part extending within said body portion, through said contact bearing member and projecting beyond said contact ring, a fixed contact member adjustably secured to said projecting part of said arm and having a contact surface, resilient balancing means connected between said contact bearing portion and said body portion said resilient means comprising a plurality of hook members extending into the interior of said contact bearing portion and a like plurality of hook members provided within said body portion in paired relationship with the hook members of the contact bearing portion and spring means extending between said pairs of hook members whereby said contact bearing portion is normally held in balanced rockable engagement with said body portion and said contact ring is normally maintained in substantially parallel spaced relationship with said contact surface, while permitting rocking of said contact bearing portion with respect to said body portion to bring said contact ring into electrical engagement with said contact surface to establish the operating circuit for the signalling device, said contact bearing portion having therefrom outwardly a plurality of arms terminating at their ends remote from the contact bearing portions in an operating member defining a closed figure and including a pair of closed ends normally connected together by a separable coupling, said operating member being adapted, when the switch unit is mounted on said steering column, to lie in parallel and closely spaced relationship to said rim.

4. A switch unit for actuating electrically operated horns and the like signaling devices, and adapted to be detachably mounted to the steering column of mechanically propelled vehicles, said steering column bearing a steering wheel including a rim, said unit comprising a switch device including a hollow body portion having clamped means for detachably mounting the device to said steering column, said body portion having at one end an annular conical spigot, adapted rockably to engage said socket, said contact bearing member having formed in its other end an inner annular recess and an outer relatively shallow annular recess, said outer recess being proximate to said other end and spaced from said inner recess, a contact ring mounted in said inner recess and insulated from said contact bearing member, an insulated conductor connecting said contact ring in the operating circuit of said signalling device, a cover plate detachably secured to the said contact bearing member and having an annular marginal portion resting in said outer recess, a plug member of electrically conducting material closing the end of said body portion remote from said contact portion and in electrical contact therewith, a stem projecting from said plug member and extending lengthwise through said body portion and into said contact bearing portion, said stem having a lower threaded portion, an upper threaded end portion of diameter smaller than said lower threaded portion and an intermediate portion separating said threaded portions and forming a lower shoulder and an upper shoulder, an anchoring member screwed onto said lower portion and having a plurality of laterally projecting arms, a plate positioned transversely within the body portion and fixedly secured thereto, said plate being centrally bored to fit over said intermediate portion and resting on said lower shoulder and having a plurality of perforations alined with the free ends of the arms of the anchoring device, a fixed contact member comprising an axially bored and internally threaded stem through onto said end portion, and a disc shape head located between said cover plate and said contact ring and overlapping said contact ring, a lip depending from the end of said contact portion remote from said contact ring and extending into said body portion, said lip having perforations alined with the perforations in said plate, a plurality of springs having one end anchored to the free end of the corresponding arm, said springs passing through the perforations in said plate and being adapted normally to hold said contact bearing portions in balanced rockable engagement with said body portion, whereby said contact ring is normally maintained in substantially parallel spaced relationship with said contact surface while permitting rocking of said contact bearing portion with respect to said body portion to bring said contact ring into its electrical engagement with said contact surface to establish the operating circuit for the signalling device, said contact bearing portion having extending therefrom outwardly a plurality of arms terminating at their ends remote from the contact bearing portion in an operating member defining a closed figure and including a pair of opposed ends normally connected together by a separable coupling, said operating member being adapted, when the switch unit is mounted on said steering column to lie in parallel and closely spaced relationship to said rim.

VICTOR KOTLIAREVSKY.